United States Patent
Adams

(10) Patent No.: US 9,738,383 B2
(45) Date of Patent: Aug. 22, 2017

(54) REMOTE CONTROLLED AERIAL RECONNAISSANCE VEHICLE

(71) Applicant: Richard D. Adams, Madison, AL (US)

(72) Inventor: Richard D. Adams, Madison, AL (US)

(*) Notice: Subject to any disclaimer, the term of this patent is extended or adjusted under 35 U.S.C. 154(b) by 0 days.

(21) Appl. No.: 15/391,517

(22) Filed: Dec. 27, 2016

(65) Prior Publication Data

US 2017/0101180 A1    Apr. 13, 2017

Related U.S. Application Data

(63) Continuation-in-part of application No. 14/716,785, filed on May 19, 2015, now Pat. No. 9,527,596, which is a continuation-in-part of application No. 13/410,225, filed on Mar. 1, 2012, now Pat. No. 9,033,281.

(60) Provisional application No. 61/448,053, filed on Mar. 1, 2011.

(51) Int. Cl.
| | |
|---|---|
| *B64D 17/00* | (2006.01) |
| *B64C 39/02* | (2006.01) |
| *B64D 17/80* | (2006.01) |
| *B64C 1/26* | (2006.01) |

(52) U.S. Cl.
CPC ............. *B64C 39/024* (2013.01); *B64C 1/26* (2013.01); *B64D 17/80* (2013.01); *B64C 2201/104* (2013.01); *B64C 2201/107* (2013.01); *B64C 2201/162* (2013.01); *B64C 2201/185* (2013.01)

(58) Field of Classification Search
CPC ... B64D 9/00; B64D 1/08; B64D 1/12; B64D 17/00; B64C 39/024; B64C 3/56; B64C 11/001; B64C 2201/185; B64C 2201/107; B64C 2201/162

USPC ........... 244/3.1, 3.14, 147, 152, 138 R, 142, 244/137.1, 139, 145, 190
See application file for complete search history.

(56) References Cited

U.S. PATENT DOCUMENTS

| | | | | |
|---|---|---|---|---|
| 6,056,237 A | * | 5/2000 | Woodland | B64C 3/40 244/120 |
| 6,758,442 B2 | * | 7/2004 | Bailey | B64D 17/34 244/142 |
| 7,467,762 B1 | * | 12/2008 | Parsons | F42B 10/56 244/138 R |
| 8,011,614 B2 | * | 9/2011 | Bird | B64C 27/18 244/12.2 |
| 8,263,919 B2 | * | 9/2012 | Murphy | F42B 12/365 244/147 |

(Continued)

*Primary Examiner* — Valentina Xavier
(74) *Attorney, Agent, or Firm* — Mark Clodfelter

(57) ABSTRACT

A remotely controlled or autonomously controlled UAV is disclosed. The UAV has both wings and a deployable parachute to enable both fixed wing flight and paraglider flight. The UAV can fly at a higher speed to a mission area as a fixed wing craft, and loiter over the area as a powered paraglider. In some embodiments, the wings are jettisoned over the mission area and the UAV configured as a powered paraglider completes its mission. In other embodiments the UAV flies to the mission area as a fixed wing craft, deploys the parachute to loiter as a powered paraglider and then jettisons the parachute to fly under a fixed wing back to a base. The former embodiment cannot fly back to a base, they may be used to carry and deploy bombs or grenades, while the latter may be used for surveillance, deliver supplies or the like.

1 Claim, 16 Drawing Sheets

(56) References Cited

U.S. PATENT DOCUMENTS

| | | | |
|---|---|---|---|
| 8,939,056 B1* | 1/2015 | Neal, III | F42B 15/22 |
| | | | 102/387 |
| 9,234,728 B2* | 1/2016 | Akcasu | F42B 10/56 |
| 2004/0196367 A1* | 10/2004 | Raymond | F42B 12/365 |
| | | | 348/144 |
| 2016/0090179 A1* | 3/2016 | Childress | B64C 29/0091 |
| | | | 244/63 |

* cited by examiner

REMOTE CONTROLLED AERIAL RECONNAISSANCE VEHICLE

CROSS REFERENCE TO RELATED APPLICATIONS

This application is a continuation-in-part of Applicant's application Ser. No. 14/716,785, filed May 19, 2015, now U.S. Pat. No. 9,527,596, issued Dec. 27, 2016, which is a continuation-in-part of Applicant's U.S. application Ser. No. 13/410,225, filed Mar. 1, 2012, now U.S. Pat. No. 9,033,281, issued May 19, 2015, and which in turn claims the benefit of Applicant's U.S. provisional application No. 61/448,053, filed Mar. 1, 2011. U.S. Pat. Nos. 9,527,596, 9,033,281 and provisional application No. 61/448,053 are hereby incorporated by reference herein in their entirety.

FIELD OF THE INVENTION

This invention relates generally to unmanned aerial vehicles (UAVs), and particularly to a small, relatively slow but powered aerial vehicle with a rapid deployment time, and which requires little or no training to use.

SUMMARY OF THE INVENTION

The present invention is a UAV system sufficiently small so as to be launched and flown by a single individual. However, the vehicle is scalable, and able to fly with multiple sizes and designs of parachutes, such as where relatively heavy loads are carried. The invention disclosed herein is a UAV with a vertical fuselage that has the ability to fly to and from a location as a fixed-wing aircraft, yet perform its desired mission at an operational location as a slow flying paraglider. The fixed wing configuration allows the vehicle to fly to and from operational areas at much greater speeds than a typical paraglider, which is limited in its forward speed due to the drag of the paraglider chute to around 20 miles per hour. In one embodiment, the paraglider UAV is equipped with wings that stay with the UAV both during fixed wing flight and paraglider flight. This allows for a rapid flight, around 50 MPH or so, to and from the operational area. This embodiment might be used for surveillance, deliver supplies or the like, and likely would be carrying a camera, video transmitter, a GPS module and/or other equipment or supplies. In another, simpler embodiment, the wings are jettisoned from the UAV once the UAV arrives at its operational area. This is desirable for a UAV that is disposable, as when it is carrying a bomb or the like, since it is unlikely that flying as a fixed wing at extended speeds and ranges will allow for the UAV to return to its starting location since it would have to return in a paraglider configuration.

BACKGROUND OF THE INVENTION

A number of systems are in use today that employ parachutes for lowering objects and people to the ground. In the simplest systems, cargo or supplies are attached to a parachute, and simply pushed from an aircraft over an area where the supplies are needed. In more complicated such systems, the parachute may be guided, as by a GPS control system associated with the parachute, so that the parachute is directed to specific GPS coordinates. In these systems, control lines from the guidance system are pulled or released to deform a portion of the parachute, causing the parachute to change direction and be guided to a destination on the ground.

Also in the prior art are powered parachutes where a person is strapped into a harness attached to the parachute, with an engine having a propeller oriented on the person's back. The engine and propeller provide thrust, with direction and altitude controlled by the person manually operating control lines attached to the parachute.

One detractor from powered and unpowered parachute or paraglider air-vehicles is the limitation of airspeed. Typical paragliders can fly between 20 and 50 miles per hour, with 50 miles per hour being extremely fast and short-lived for a paraglider. To reach and maintain speeds in excess of 50 miles an hour for extended periods of time during a flight, fixed wings or the like must be used.

With respect to military missions, it is desirable for a UAV to loiter over a target or area, particularly during a combat operation. While Applicant's previous designs are useful, such designs typically have small payloads, short ranges and typically are carried by a soldier. Also, such as where a reconnaissance patrol comes under attack, a parafoil UAV of Applicant's previous design may not be able to easily be launched without endangering the person launching the UAV.

Even with advanced designs, such as Louis Strieber's speed enhanced powered parachute, U.S. Pat. No. 5,901,924, an air-vehicle will have to use an enormous amount of power to overcome the drag of the complex and much heavier parachute design, thus increasing the amount of energy required to obtain higher speeds as well as having a shorter time-on-station when compared to a typical winged aircraft.

Accordingly, it would be desirable for a UAV to have fixed wings in order to quickly fly to a desired location, and then loiter or perform a mission using powered paraglider flight.

DETAILED DESCRIPTION OF THE DRAWINGS

Figure 1:
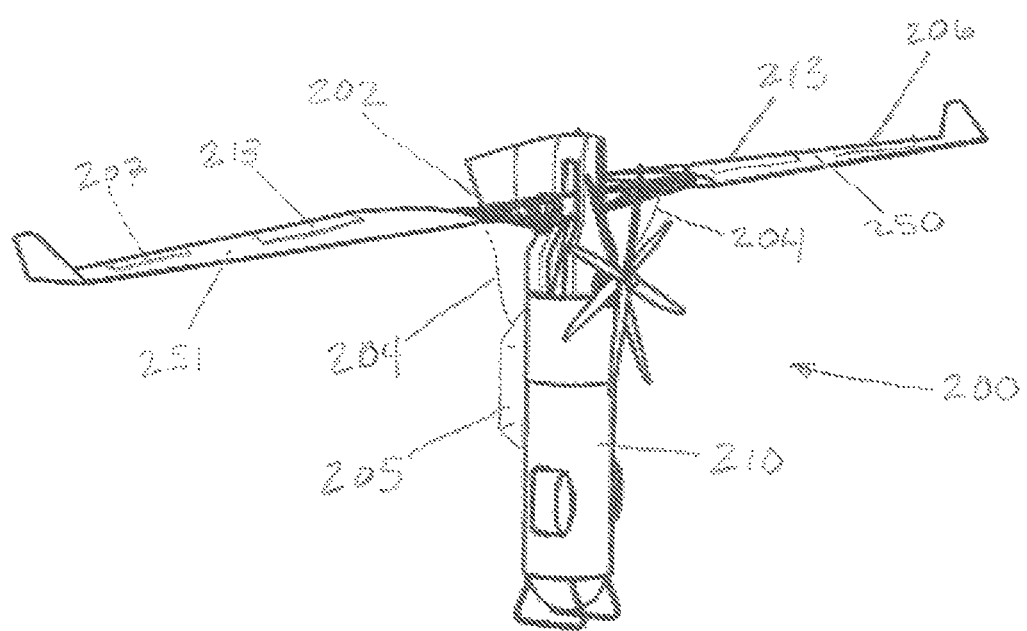
FIG. 1 is an illustration of one embodiment of a fixed wing/paraglider UAV without a parachute deployment of the instant invention.
Figure 3:
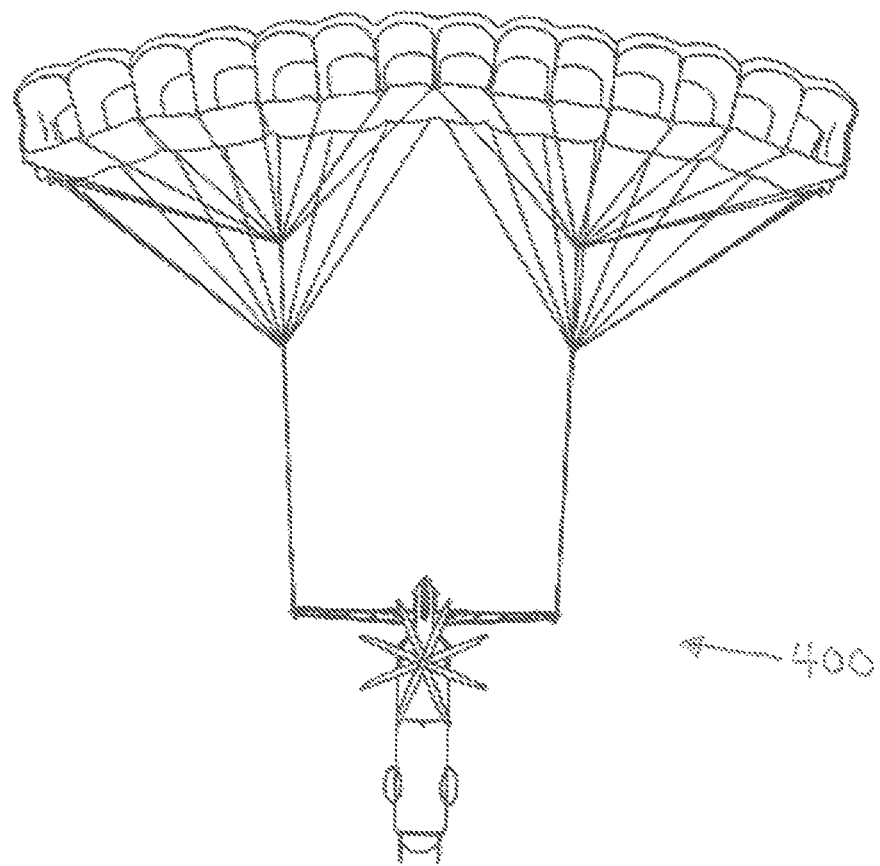
FIG. 3 is a front planar view of one embodiment of Applicant's prior art paraglider.
Figure 5:
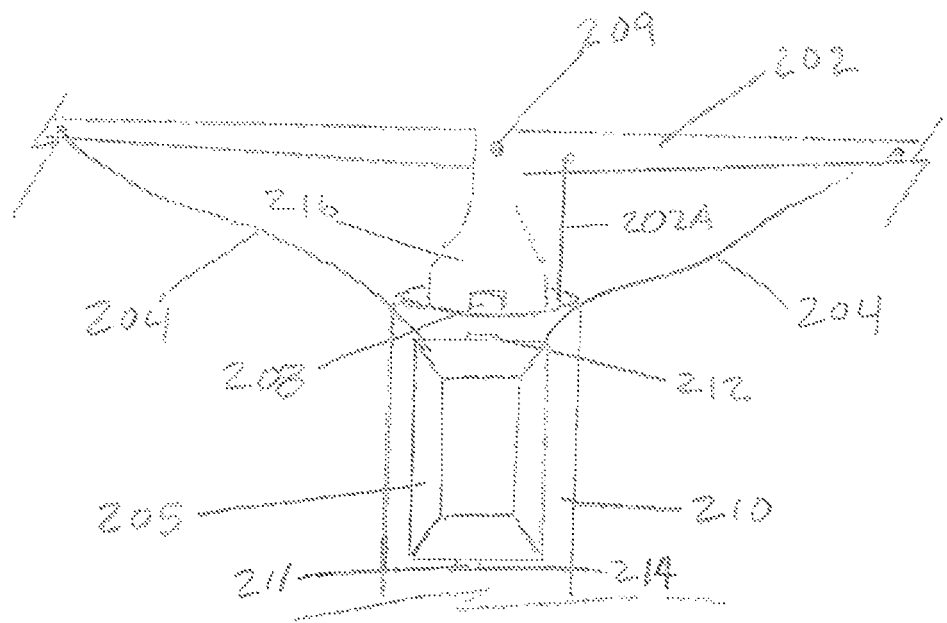
FIG. 5 is an enlarged planar view of a rear of an upper portion of a fuselage of the embodiment of FIG. 2 showing a rear of a parachute compartment.

Referring initially to FIG. 1, a front perspective view of a fixed-wing parafoil UAV 200 is shown, and is a variation of a UAV 400 disclosed in Applicant's U.S. Pat. No. 9,033,281, as shown in FIG. 3. As shown in FIG. 1, fuselage 210 hangs vertically and perpendicular to the ground, as disclosed in Applicant's prior incorporated patents, with wings 250, 251 mounted in a typical fixed-wing configuration at the upper end of the fuselage onto extended control arm 202. Control arm 202 is connected to motor and control system mount 216 (FIG. 5). Extended control arm 202 attaches to motor and control system mount 216 via a pivot point 209 (FIG. 5), which may be a bolt and nut, an axle or the like. Extended control arm 202 may be manufactured into the wings 250 and 251, and also serve as wing spars for fixed wing structural support. As noted in the incorporated patents, a surveillance dome and landing gear and other equipment may be mounted at a lower end of returnable UAVs, while a bomb, grenade or the like may be loaded into or dropped from a UAV not designed to return to a home base.

A push/pull control rod 202A (FIG. 5) operated by a servo or the like moves control arm 202 vertically in order to control a parachute or parafoil. Each wing has additional control surfaces, such as control elevators 213, and possibly ailerons 206 and 207, to facilitate direction and pitch control primarily when the UAV is flying in a fixed-wing configuration. Parachute control lines 204 are connected to paraglider parachute or parafoil 201 (FIG. 2, 2A) that is housed in parachute housing 205 (FIG. 1) during fixed-wing flight.

Figure 2:
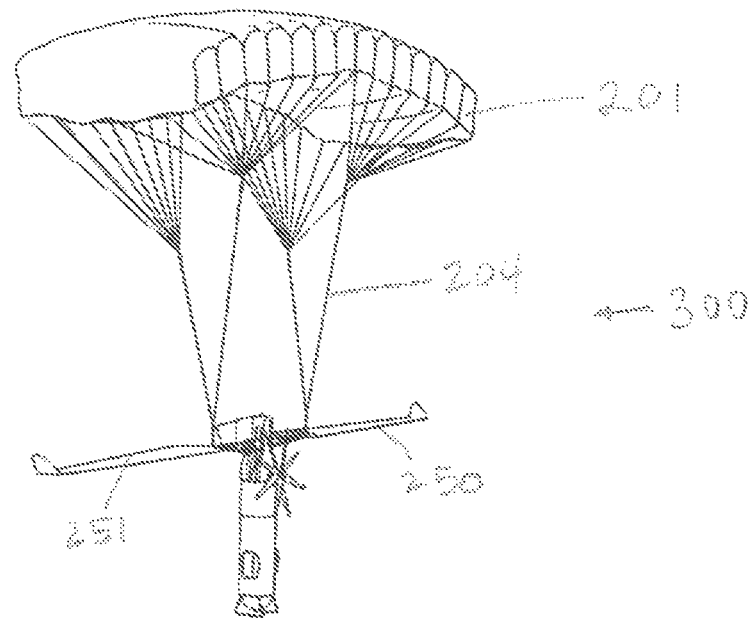
FIG. 2 is a front perspective illustration of the fixed wing/paraglider UAV of FIG. 2 with a parachute deployed.

FIG. 2 is a front perspective view of a UAV in a paraglider/fixed-wing air-vehicle 300 configuration. The paraglider chute 201 is shown in a deployed configuration and connected to control arm 202 (FIG. 2A) via chute control lines 204. Wings 250 and 251 provide some lift while in this paraglider mode, and the control surfaces may provide some assist in controlling direction and altitude.

Figure 2A:
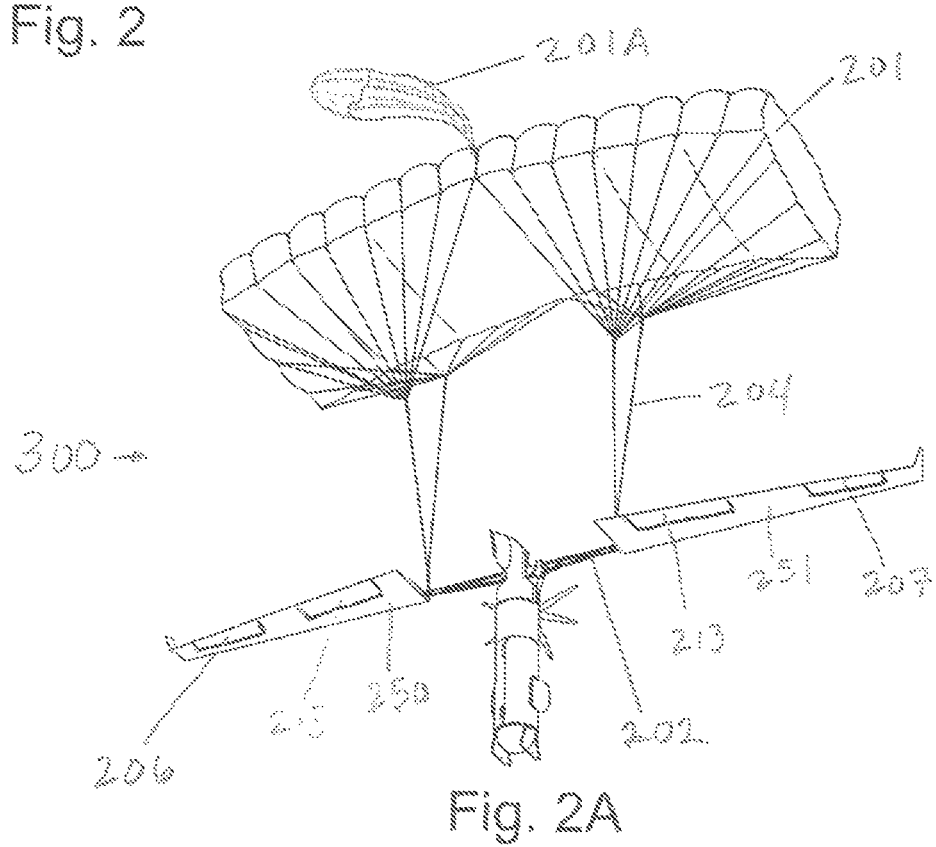
FIG. 2A is a rear perspective illustration of the fixed wing/paraglider of FIG. 2.

FIG. 2A is a rear, lower perspective view of UAV 300 with the paraglider parachute deployed and showing wings 250 and 251, as well as elevators 213 and left and right ailerons, 206 and 207 respectively. In some embodiments, a drogue parachute 201A may be used to assist with deployment of paraglider chute 201. Drogue parachute 201A may be temporarily attached to paraglider chute 201, for example by means of a temporary adhesive or tape (not shown), a releasable catch or latch or other temporary attachment, which would allow drogue chute 201A to separate from paraglider chute 201 after the paraglider chute has fully deployed. This would eliminate drag due to drogue 201A.

Figure 2B:
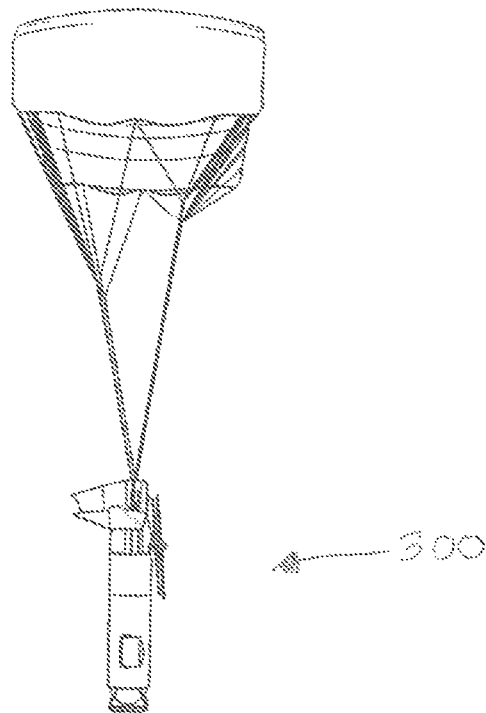
FIG. 2B is a side planar view of the fixed wing/paraglider of FIG. 2.
Figure 2C:
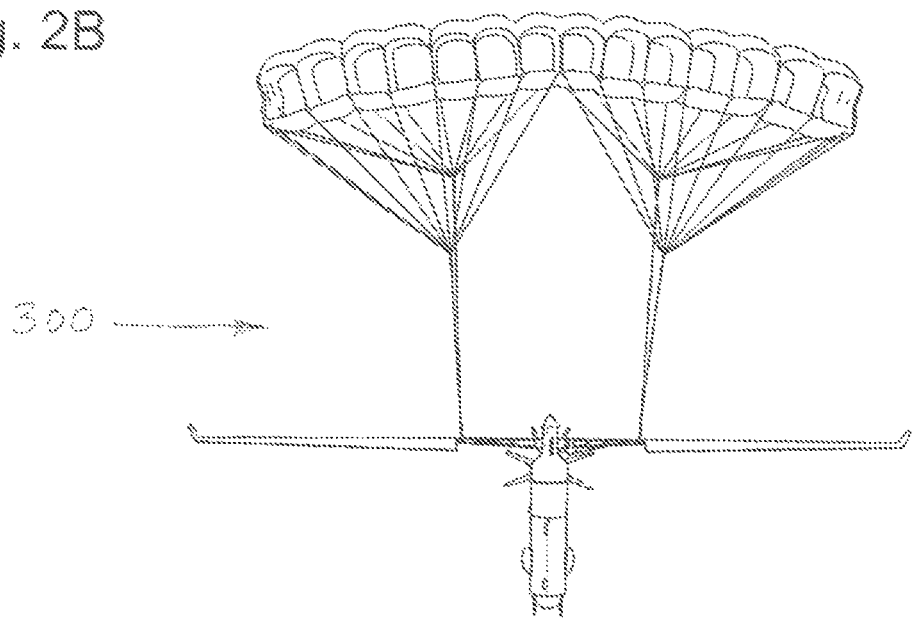
FIG. 2C is a rear planar view of the fixed wing/paraglider of FIG. 2.

FIG. 2B depicts a right side orthogonal view of the paraglider/fixed-wing air-vehicle 300. FIG. 2C depicts a rear orthogonal view of the paraglider/fixed wing air-vehicle 300.

Figure 2D:
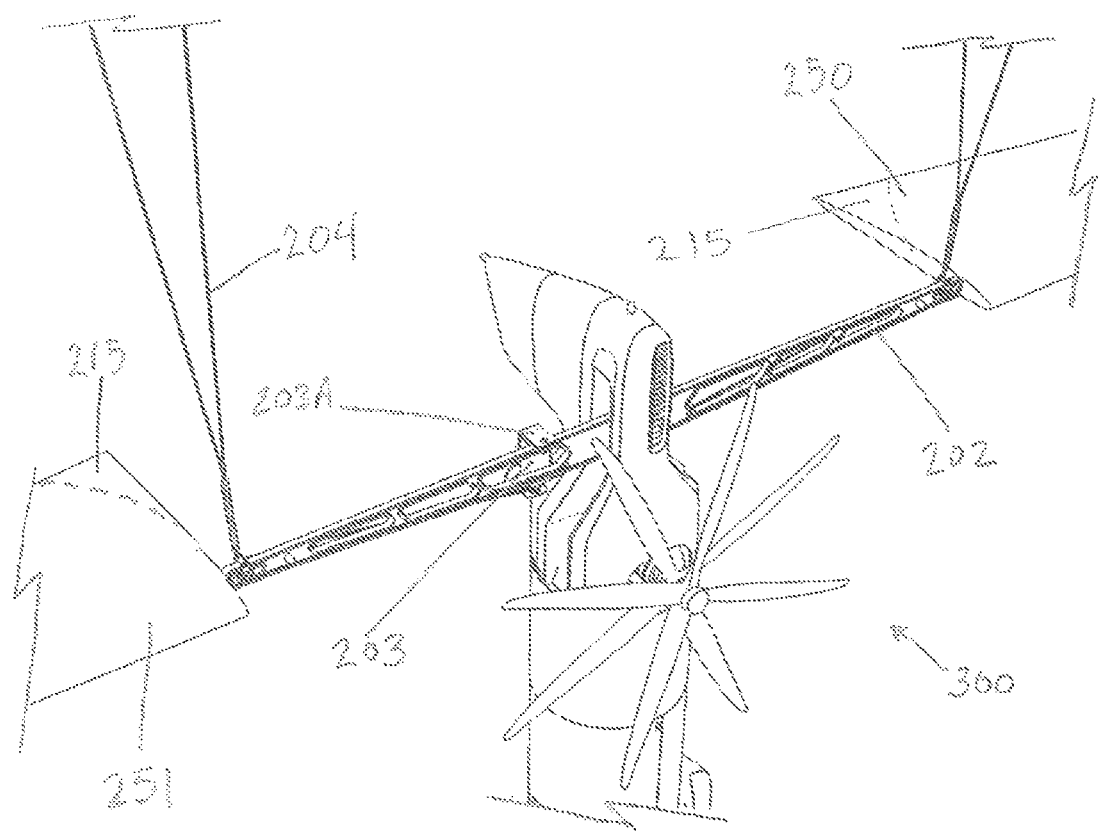
FIG. 2D is an enlarged view showing construction details of an upper portion of a fuselage of the fixed wing/paraglider of FIG. 2.

FIG. 2D depicts a close-up perspective view of paraglider/fixed-wing air-vehicle 300, with extended control arm 202 and a parachute control line 204 lock/release solenoid 203 mounted to extended control arm 202 via a lock/release solenoid mount 203A. In one embodiment, wings 250 and 251 may be trimmed or rounded at 215 to assist in paraglider parachute deployment by preventing snagging of the control lines by inner trailing edges of the wings.

Figure 4:
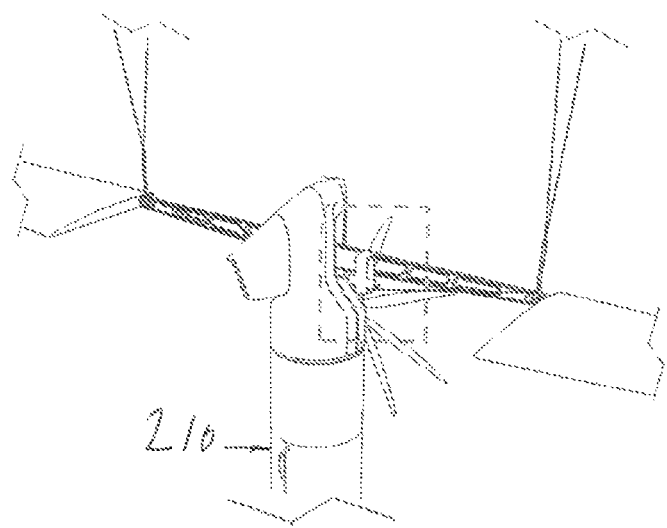
FIG. 4 is a rear perspective view of a canister portion of the fuselage of the fixed wing/paraglider of FIG. 2.
Figure 4A:
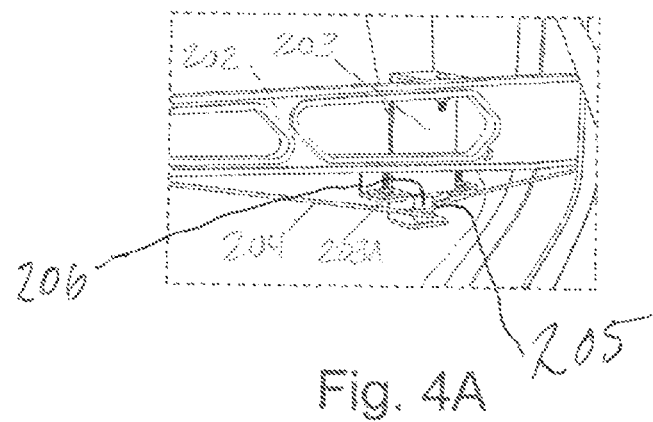
FIG. 4A is an enlarged view of a portion of a support strut showing construction details thereof.

FIGS. 4 and 4A depict an aft perspective view of an upper portion of fuselage 210 showing parachute line lock/release solenoid 203 mounted to a rear of extended control arm 202. FIG. 4A is an expanded view of lock/release solenoid 203 secured to extended control arm 202 via a lock/release solenoid mount 203A. The parachute control lines 204 have loops 205, with loops 205 held in place by a normally extended solenoid plunger 206. When plunger 206 is retracted, as by a radio or other electrical command, plunger 206 is retracted to release the parachute lines, releasing the parachute and allowing UAV 300 (FIG. 4) to once again convert back to a fixed-wing configuration. As such, some embodiments of the UAV of the instant invention may be capable of fixed wing flight, then paraglider flight then fixed wing flight again. This allows the UAV to fly to a region to be observed, loiter over the region and then fly back to its base.

FIG. 5 is a rear orthogonal view of the upper portion of UAV body 210 with the upper fuselage fairing removed, allowing a mounting of extended control arm 202 to motor and control system mount 216 via a motor and control arm mount pivot point 209. The paraglider chute 201 (FIG. 2) is connected to chute control lines 204, which are connected to extended control arm 202. Extended control arm 202 is pushed or pulled by extended control arm push/pull rod 202A to tilt the paraglider parachute lines 204 and wings up or down, steering the parachute.

Figure 5A:
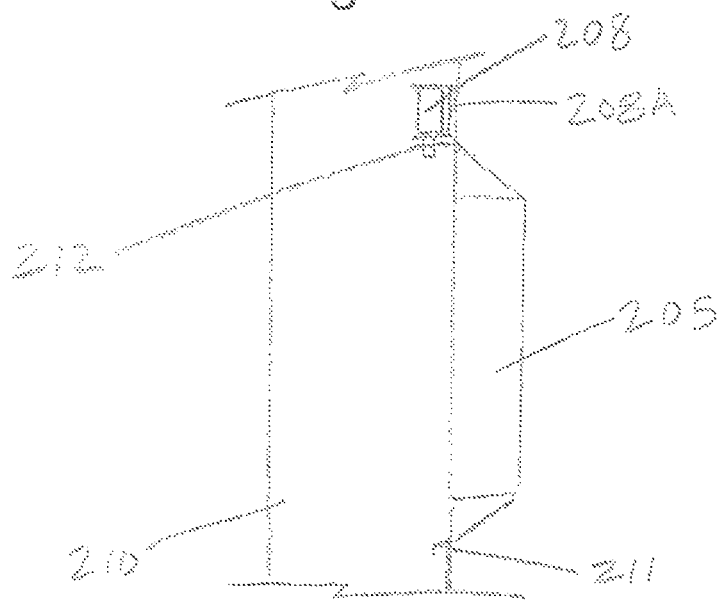
FIG. 5A is an enlarged side planar view of the upper portion of a fuselage of the embodiment of FIG. 2 showing a side of a parachute compartment.

FIG. 5A (orthogonal side view) depicts parachute housing 205, which contains paraglider parachute 201 being held to UAV body 210 by a parachute housing lock/release solenoid 208 and held to fuselage 210 by a parachute housing lock/release solenoid mount 208A. Parachute housing lock/release solenoid 208 holds housing 205 to fuselage 210 by a normally extended solenoid plunger protruding through parachute housing lock/release tab 212. Once parachute housing lock/release solenoid 208 has been activated, the solenoid plunger retracts and releases parachute housing 205 and allows the chute housing mounting tab to be released from the locking slot 214 in UAV body 210. Parachute housing 205 then falls away from UAV 210, allowing the parachute to fall away and inflate.

Another embodiment of the present invention embodies a releasable wing system that allows the wings to be released, and deploying a paraglider parachute. This embodiment allows the UAV to use a fixed-wing configuration to fly to an operational area at higher speeds, and then jettison the wings to perform its mission in a paraglider configuration. This embodiment allows for faster in route flight speeds to a location, but does not allow for fixed-wing flight in its return flight as is the case for the embodiments described previously.

Figure 6:
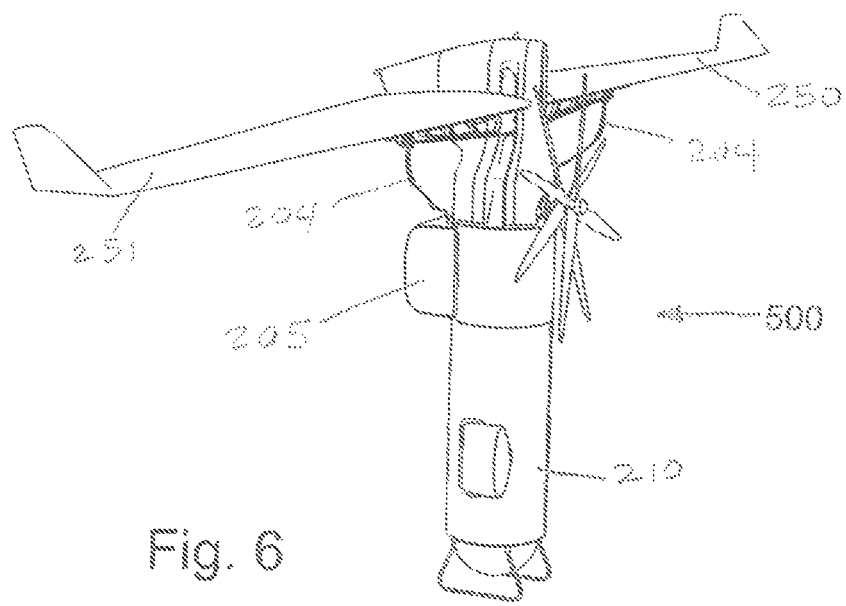
FIG. 6 is a perspective view of a fixed wing configuration of the embodiment of FIG. 2.

FIG. 6 depicts a frontal perspective view of an ejectable fixed-wing air-vehicle 500 showing air-vehicle body 210 hanging in a vertical configuration. FIG. 6 depicts wings 250 and 251 as previously described, and mounted to control arm 217 (FIG. 6B). Paraglider parachute 201 (FIG. 2) is packed inside parachute housing 205 (FIG. 5, 5B) and is connected to control arm 217 via parachute control lines 204.

Figure 6A:
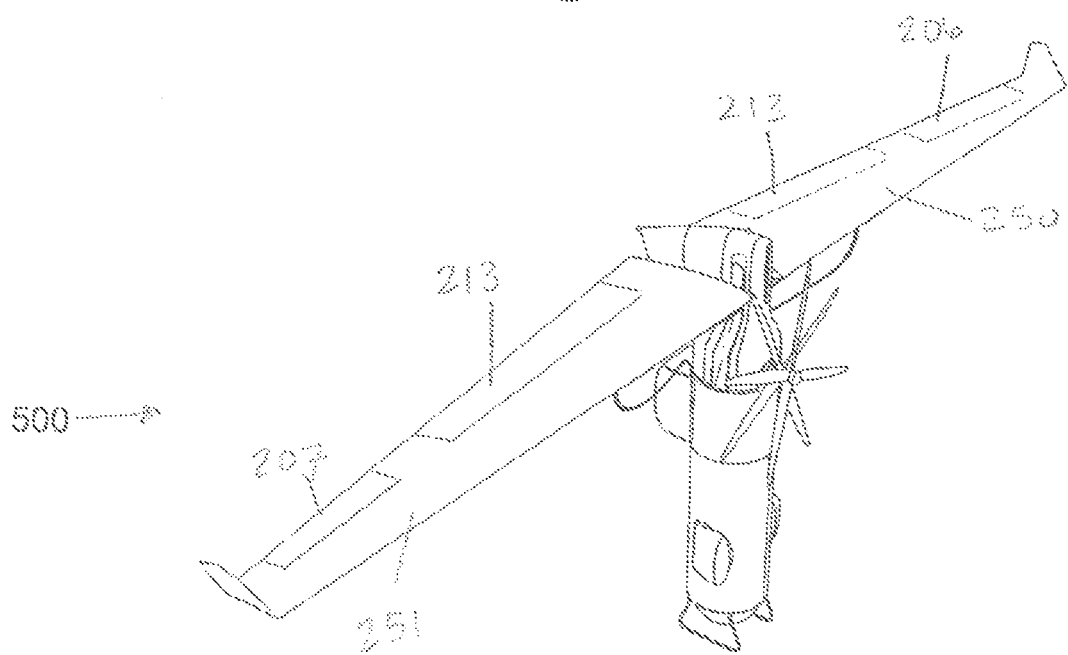
FIG. 6a is a perspective view of the fixed wing configuration of FIG. 6 showing control surfaces of the fixed wings.
Figure 6B:
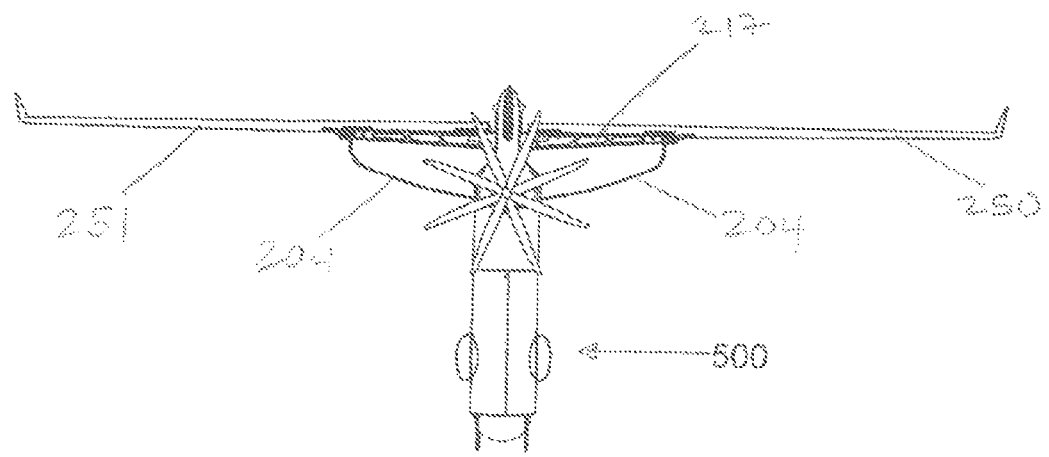
FIG. 6B is a front planar view of the fixed wing configuration of FIG. 6.

FIG. 6A is a downward, side, frontal perspective view of a releasable wing UAV 500 showing the left and right wings 250 and 251 respectively, the left aileron 206, the right aileron 207, and the elevators, 213. When the UAV is flying in fixed-wing configuration, as depicted in FIG. 6A, the wing control surfaces, such as the elevators 213 and the ailerons 206 and 207, will provide a majority of directional and pitch control of the UAV. In one embodiment, the wings can provide all of the flight directional and pitch control, while in another embodiment, the wings can be tilted up or down to facilitate banking of the UAV. In yet another embodiment, both control surfaces and tilting of the wing may be used to maneuver the UAV while in fixed wing flight. As described above, while it is anticipated that the wings are generally ineffective while paragliding, they may still provide some lift and use of the control surfaces, particularly at higher paragliding speeds.

FIG. 6B depicts a front orthogonal view of a releasable wing UAV 500, its left and right wings 250 and 251, parachute control lines 204 and control arm 217.

Figure 6C:
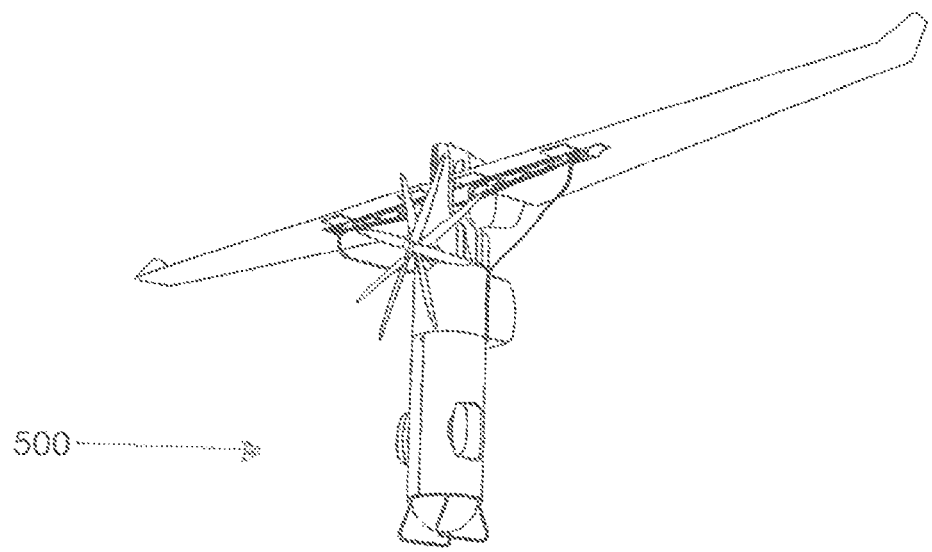
FIG. 6C is a side perspective view of the fixed wing configuration of FIG. 6.

FIG. 6C depicts an upward, forward, side perspective view of releasable wing UAV 500.

Figure 6D:
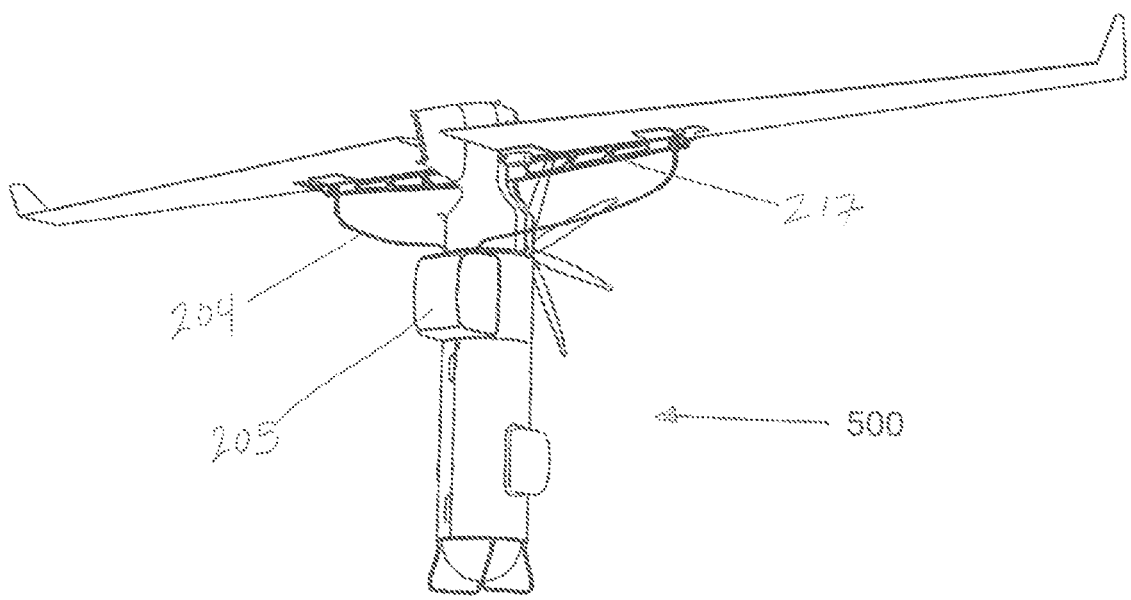
FIG. 6D is a rear perspective view of the fixed wing configuration of FIG. 6.

FIG. 6D depicts a rear perspective view of the releasable wing UAV 500 with parachute control lines 204 extending out from parachute housing 205 and connecting to control arm 217.

Figure 7:
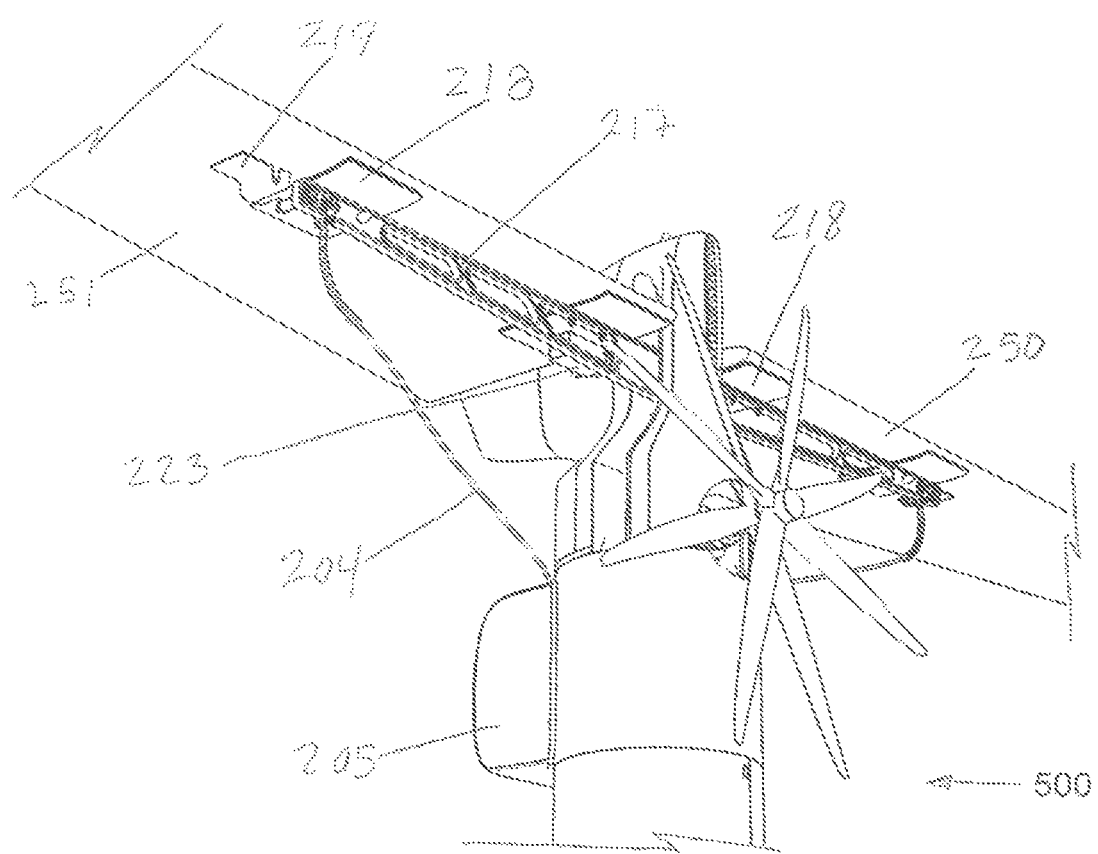
FIG. 7 is an enlarged, front lower perspective view of another embodiment of a fixed wing/paraglider of the instant invention showing construction details thereof.

FIG. 7 depicts a perspective view of releasable wing UAV 500 and its control arm 217 mounted under and to a bottom of wings 250, 251, whereas the previous embodiment of FIG. 1 incorporated an extended control arm 202 (FIG. 2A) which was built into the wings and served as both a wing spar and parachute control arm, making jettisoning the wings impossible. The embodiments of FIG. 7 allow for release of wings 250 and 251 from control arm 217 by a command given to a wing lock/release solenoid 223 via radio commands from a UAV operator or other command source. Wings 250 and 251 rest against hard points designated as control arm wing mounting plates 218 and are locked into an outer most part of the wing by a wing female locking tab 219. Once wings 250 and 251 are commanded to be released from UAV 500, paraglider parachute 201 (FIG. 2), which is connected to control arm 217 via parachute control lines 204, are deployed from parachute housing 205 using the same manner as described for previous embodiments of FIG. 1.

Figure 7A:
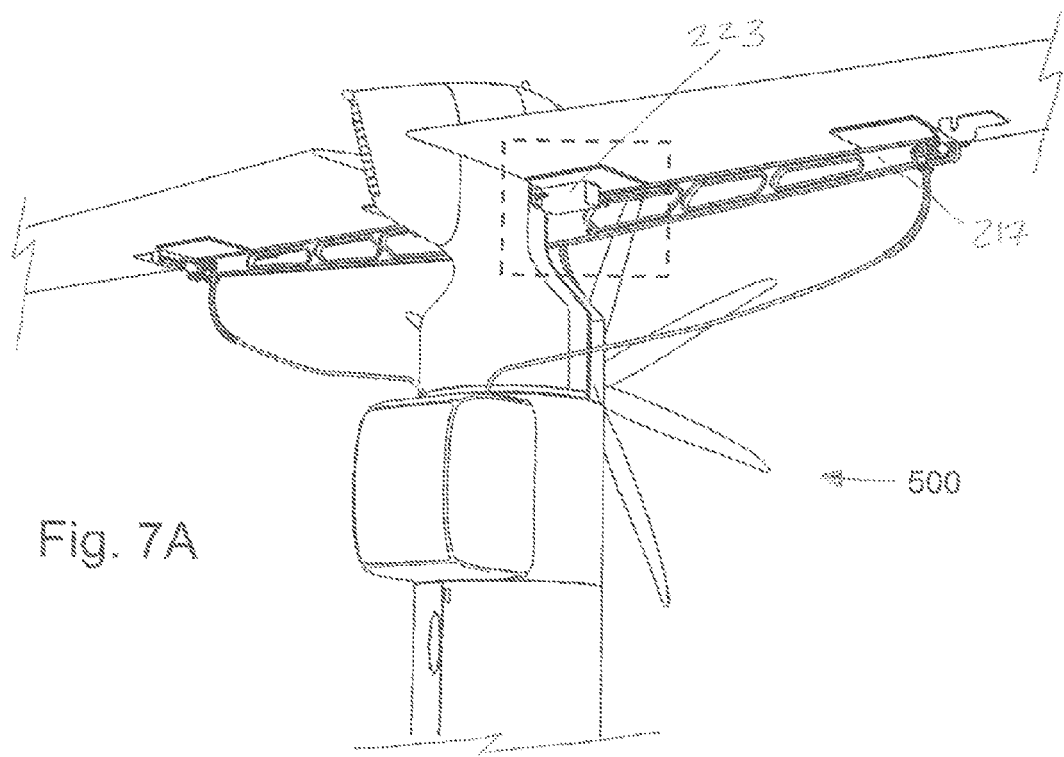
FIG. 7A is an enlarged, rear lower perspective view of the embodiment of FIG. 7 showing construction details thereof.
Figure 7B:
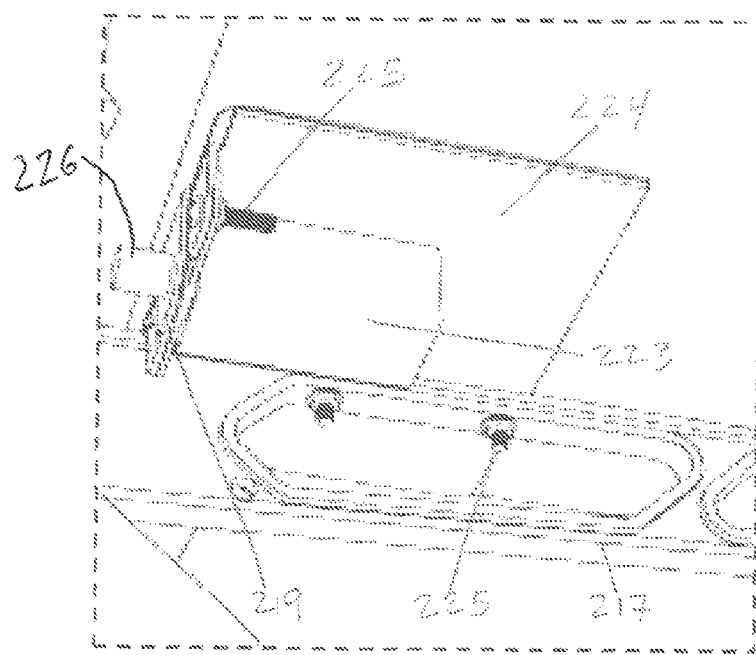
FIG. 7B is an enlarged perspective view of an underneath portion of a wing showing construction details thereof.

FIG. 7A depicts a perspective view of a rear upper portion of releasable wing UAV 500 depicting a mounting position of wing lock/release solenoid 223 mounted on control arm 217. FIG. 7B is an enlarged detail view of wing lock/release solenoid 223, which is mounted to wing lock/release solenoid mounting plate 224 via fasteners 225. Wing lock/release solenoid mounting plate 224 is mounted to control arm 217 via fasteners 225. A normally extended wing lock/release solenoid plunger 226 protrudes through an opening in wing locking plate 219. When wing lock/release solenoid plunger 226 is given a command to retract, wings 250, 251 are released from the inner most attachment point of control arm 217, which allows the wings to begin to detach.

Figure 8:
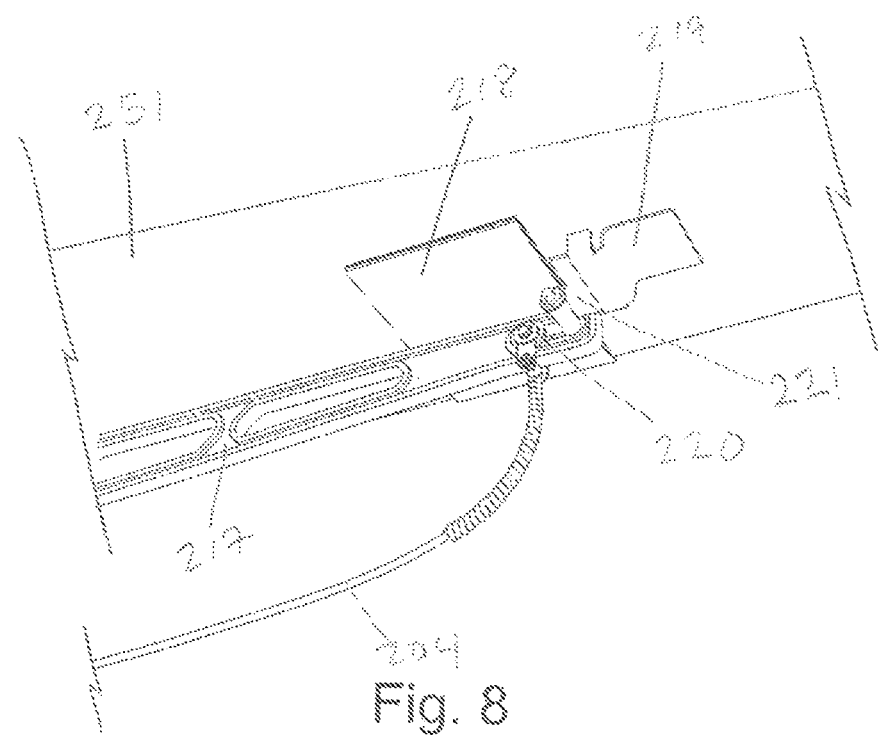
FIG. 8 and FIG. 8A are enlarged perspective views showing positions of a parachute cord during parachute deployment.
Figure 8A:
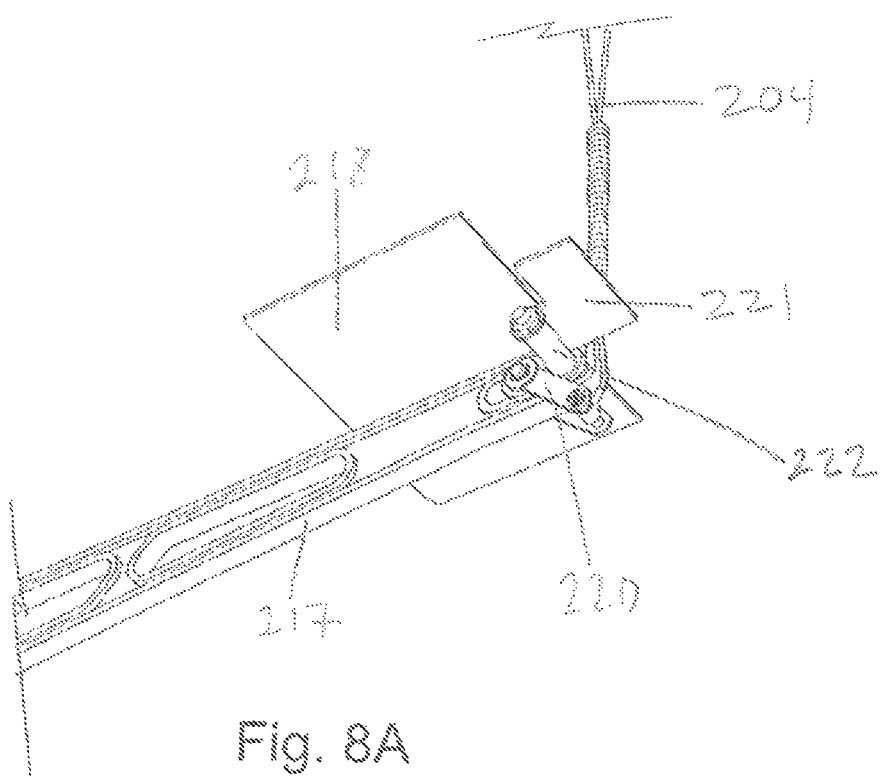

FIGS. 8 and 8A depict an outermost locking point of control arm 217, depicting control arm wing mounting plate 218 mounted to a bottom of wings 250, 251. A control arm wing locking tab 221 mounted to the outermost end of control arm 217 is positioned inside wing female locking tab 219. Control arm wing locking tab roller 222 allows wing female locking tab 219 to rotate in order to assist control arm wing locking tab 221 to release from wing female locking tab 219 during wing separation from control arm 217. Once wings 250 and 251 separate from control arm 217, parachute control line 204 can swivel into position with assistance of a chute control line rolling clevis 220, allowing paraglider parachute 201 to deploy for paraglide operation.

Figure 9:
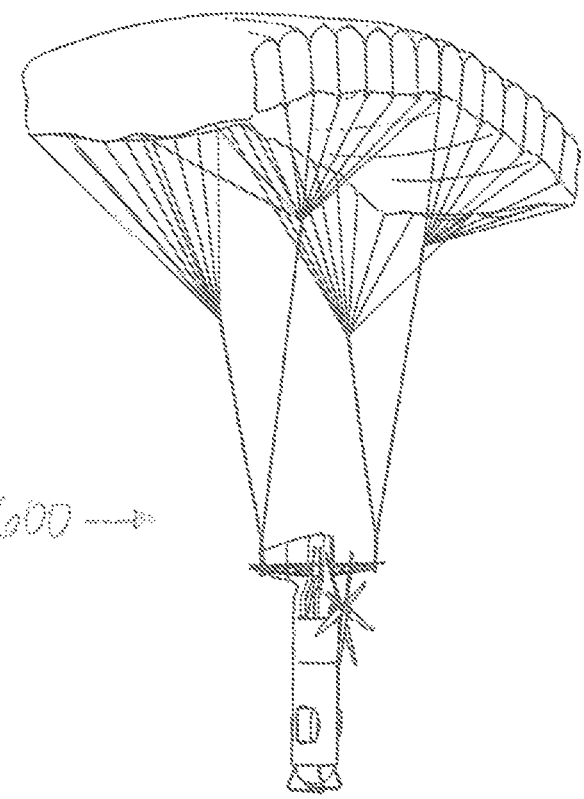
FIG. 9 is a front perspective view of the embodiment of FIG. 7.

FIG. 9 depicts a front perspective view of the UAV paraglider after wings 250, 251 have been jettisoned.

Figure 10:
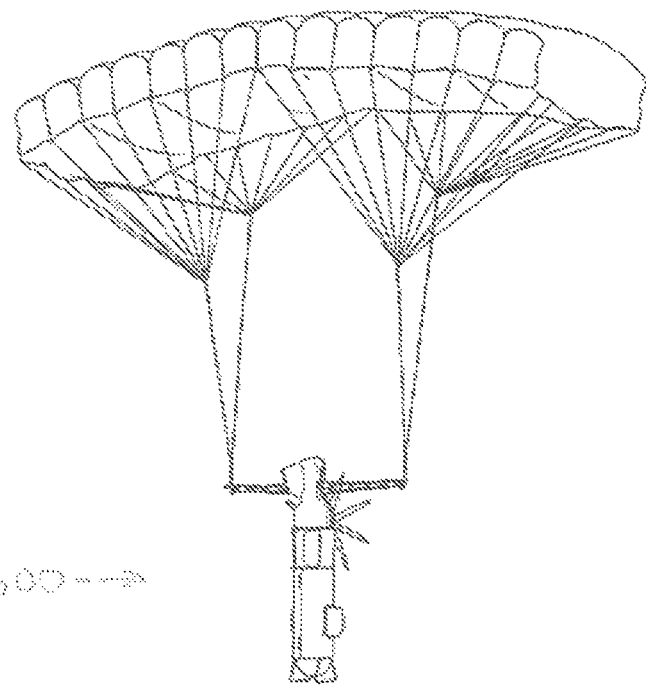
FIG. 10 is a rear perspective view of the embodiment of FIG. 7.

FIG. 10 depicts a rear perspective view of the UAV paraglider 600 after the wings have been jettisoned.

Figure 11:
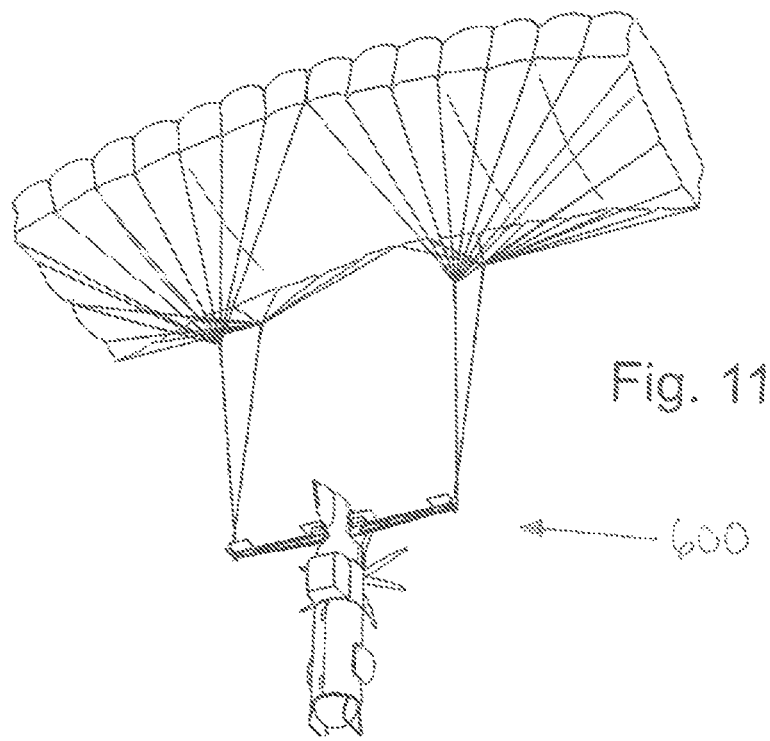
FIG. 11 is a lower rear perspective view of the embodiment of FIG. 7.

FIG. 11 depicts a rear upward perspective view of the UAV paraglider 600 after the wings have been jettisoned.

Figure 12:
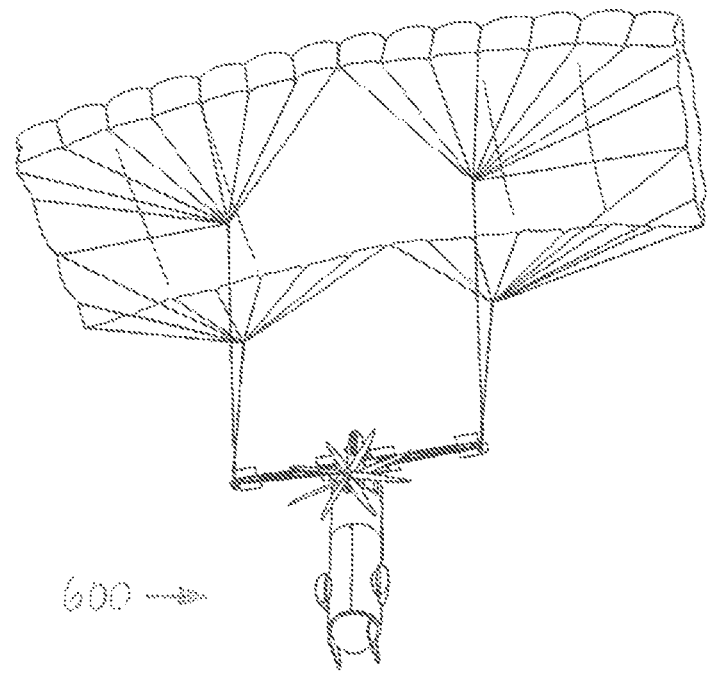
FIG. 12 is a rear perspective view of the embodiment of FIG. 7.

FIG. 12 depicts a front upward perspective view of the UAV paraglider 600 after the wings have been jettisoned.

Figure 13:
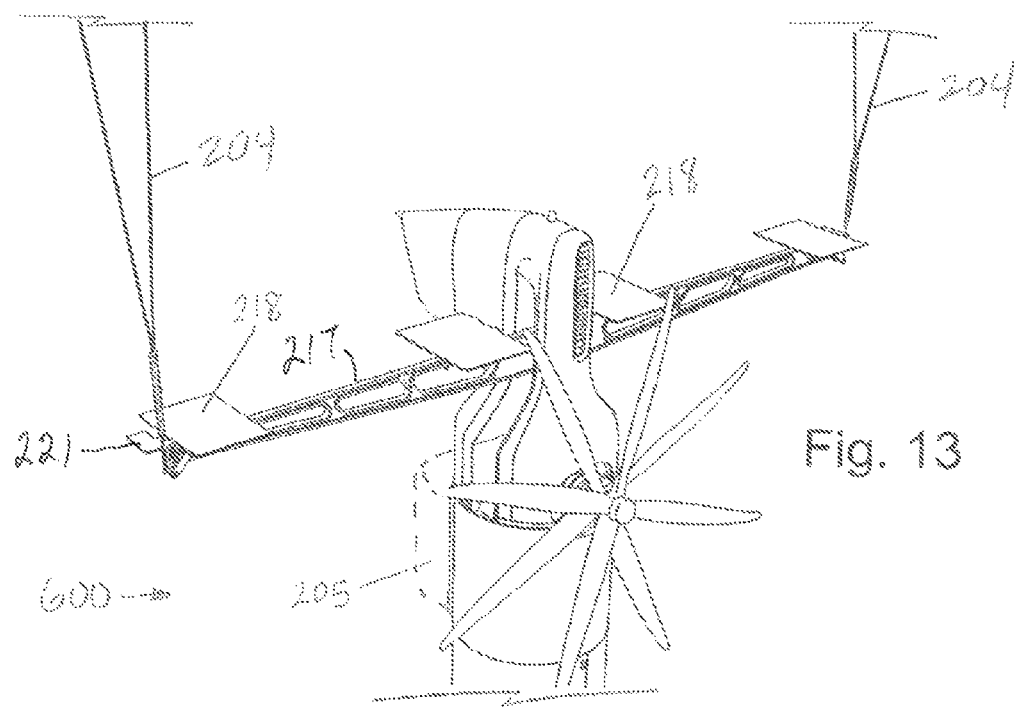
FIG. 13 is an enlarged front perspective view of an upper portion of the fuselage of FIG. 7.
Figure 13A:
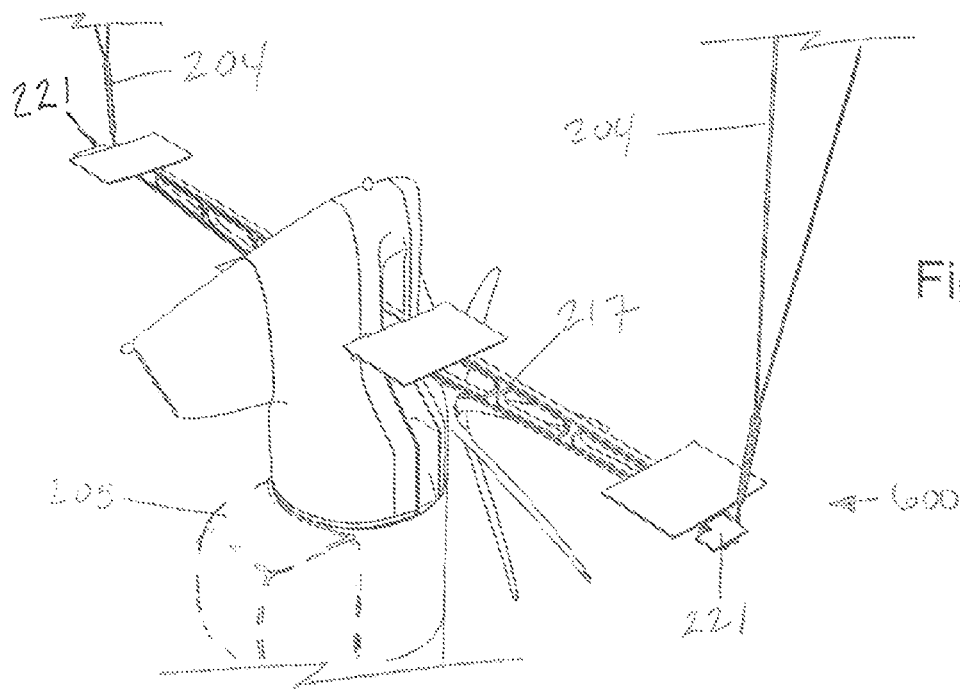
FIG. 13A is an enlarged rear perspective view of an upper portion of FIG. 7.

FIG. 13 and FIG. 13A depict a front and rear perspective view of an upper section of paraglider UAV 600 depicting an outline of released paraglider parachute 201 and parachute housing 205 (dashed lines). Parachute control lines 204 are shown in a deployed position, with control arm wing mounting plates 218 visible on control arm 217. Control arm wing locking tab 221 is visible after separation of the wings, and remains at the outer most ends of control arm 217.

It should be apparent that various modifications to the invention may be made, and any number of combinations using some or all of various elements disclosed are possible, all of which being considered a part of this disclosure and the following appended claims, wherein I claim:

1. An unmanned aerial vehicle comprising:
   an elongated fuselage,
   one or more wings coupled to an upper portion of said fuselage, suspending said fuselage in a vertical orientation for powered fixed wing flight,
   a control arm extending from both sides of said upper portion of said fuselage, said control arm attached to a pivot point at said upper portion of said fuselage, said control arm responsive to commands to move ends of said control arm in vertical directions,
   a parachute deployable from said fuselage,
   at least a pair of control lines extending from said parachute for supporting said fuselage in said vertical orientation and steering said parachute, one control line of said pair of control lines extending from said parachute to one end of said control arm and the other control line of said pair of control lines extending to the other end of said control arm,
   a controllable wing release configured to release at least said one or more wings from said fuselage,
   a parachute release for deploying said parachute from said fuselage after said one or more wings are released, a source of thrust mounted at said upper portion of said fuselage, for powering said unmanned aerial vehicle, whereby said unmanned aerial vehicle is able to fly at a higher speed to a destination as a fixed wing vehicle, release said one or more wings and deploy said parachute and fly over said destination as a powered paraglider.

\* \* \* \* \*